United States Patent
Mishima et al.

(10) Patent No.: US 9,245,316 B2
(45) Date of Patent: Jan. 26, 2016

(54) IMAGE PROCESSING DEVICE, IMAGE PROCESSING METHOD AND NON-TRANSITORY COMPUTER READABLE MEDIUM

(71) Applicant: KABUSHIKI KAISHA TOSHIBA, Minato-ku (JP)

(72) Inventors: Nao Mishima, Inagi (JP); Toshimitsu Kaneko, Kawasaki (JP); Takashi Ida, Kawasaki (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 0 days.

(21) Appl. No.: 14/478,228

(22) Filed: Sep. 5, 2014

(65) Prior Publication Data
US 2015/0071567 A1 Mar. 12, 2015

(30) Foreign Application Priority Data
Sep. 6, 2013 (JP) ................................. 2013-185657

(51) Int. Cl.
G06K 9/36 (2006.01)
G06T 3/40 (2006.01)
G06K 9/52 (2006.01)

(52) U.S. Cl.
CPC ............... *G06T 3/4053* (2013.01); *G06K 9/52* (2013.01)

(58) Field of Classification Search
USPC ......... 382/236, 291, 295, 151, 275, 299, 107; 348/441, 699, 208.1, 700, E5.066; 375/240.12, 240.16; 386/226, E5.069
See application file for complete search history.

(56) References Cited

U.S. PATENT DOCUMENTS

| | | | |
|---|---|---|---|
| 5,812,199 A * | 9/1998 | Lu et al. ................... | 375/240.16 |
| 7,477,802 B2 | 1/2009 | Milanfar et al. ............. | 382/299 |
| 7,593,037 B2 | 9/2009 | Matsumoto et al. ........ | 348/222.1 |
| 7,667,778 B2 * | 2/2010 | Yoshiwara .................... | 348/699 |
| 8,385,602 B2 * | 2/2013 | Kaino et al. .................. | 382/107 |

FOREIGN PATENT DOCUMENTS

| | | |
|---|---|---|
| JP | 2007-67909 A | 3/2007 |
| JP | 4671429 B2 | 4/2011 |

OTHER PUBLICATIONS

Sina Farsiu, et al., "Robust Shift and Add Approach to Super-Resolution", Proc. SPIE Conf. Applications of Digital Signal and Image Processing, (Aug. 2003), pp. 121-130.

Henrique S. Malvar, et al., "High-Quality Linear Interpolation for Demosaicing of Bayer-Patterned Color Images", IEEE, ICASSP, vol. 3, (2004), pp. 485-488.

* cited by examiner

*Primary Examiner* — Anh Do
(74) *Attorney, Agent, or Firm* — Oblon, McClelland, Maier & Neustadt, L.L.P.

(57) ABSTRACT

There is provided an image processing device including: a motion vector acquirer, a position generator, a weight calculator and an image generator. The acquirer acquires motion vectors with respect to a reference frame for pixels of an input frame. The position generator generates first position information indicating a position on a first frame on a basis of position information in the input frame and the motion vector of the pixel, for each pixel of the input frame. The calculator calculates a weight depending a distance from the position indicated by first position information to a pixel of the first frame, for each pixel of the first frame. The generator calculates an output pixel value, for each pixel of the first frame, on a basis of the weight and a pixel value of the pixel in the input frame, to generate an output frame.

15 Claims, 14 Drawing Sheets

| G | R | G | R |
|---|---|---|---|
| B | G | B | G |
| G | R | G | R |
| B | G | B | G |

FIG. 11

IMAGE PROCESSING DEVICE, IMAGE PROCESSING METHOD AND NON-TRANSITORY COMPUTER READABLE MEDIUM

CROSS-REFERENCE TO RELATED APPLICATIONS

This application is based upon and claims the benefit of priority from Japanese Patent Application No. 2013-185657, filed Sep. 6, 2013; the entire contents of which are incorporated herein by reference.

FIELD

Embodiments described herein relate to an image processing device, an image processing method, and a non-transitory computer readable medium.

BACKGROUND

There is an image processing device that performs a super-resolution process on an image by aligning and superimposing a plurality of frames of a low-resolution image. However, this image processing device simply superimposes the frames in units of an integer number of pixels, and a grid-like artifact (noise) is occasionally generated. To remove the grid-like artifact, it is necessary to perform "TV (Total Variation)" regularization.

BRIEF DESCRIPTION OF THE DRAWINGS

FIG. 11 is a diagram that illustrates an example of a Bayer array;

DETAILED DESCRIPTION

According to one embodiment, there is provided an image processing device including: a motion vector acquirer, a position generator, a weight calculator and an image generator.

There is provided an image processing device including: a motion vector acquirer, a position generator, a weight calculator and an image generator.

The acquirer acquires motion vectors with respect to a reference frame for pixels of an input frame. The position generator generates first position information indicating a position on a first frame on a basis of position information in the input frame and the motion vector of the pixel, for each pixel of the input frame.

The calculator calculates a weight depending on a distance from the position indicated by first position information to a pixel of the first frame, for each pixel of the first frame.

The generator calculates an output pixel value, for each pixel of the first frame, on a basis of the weight and a pixel value of the pixel in the input frame, to generate an output frame.

In the following, embodiments are described with reference to the drawings.

(First Embodiment)

Figure 1:
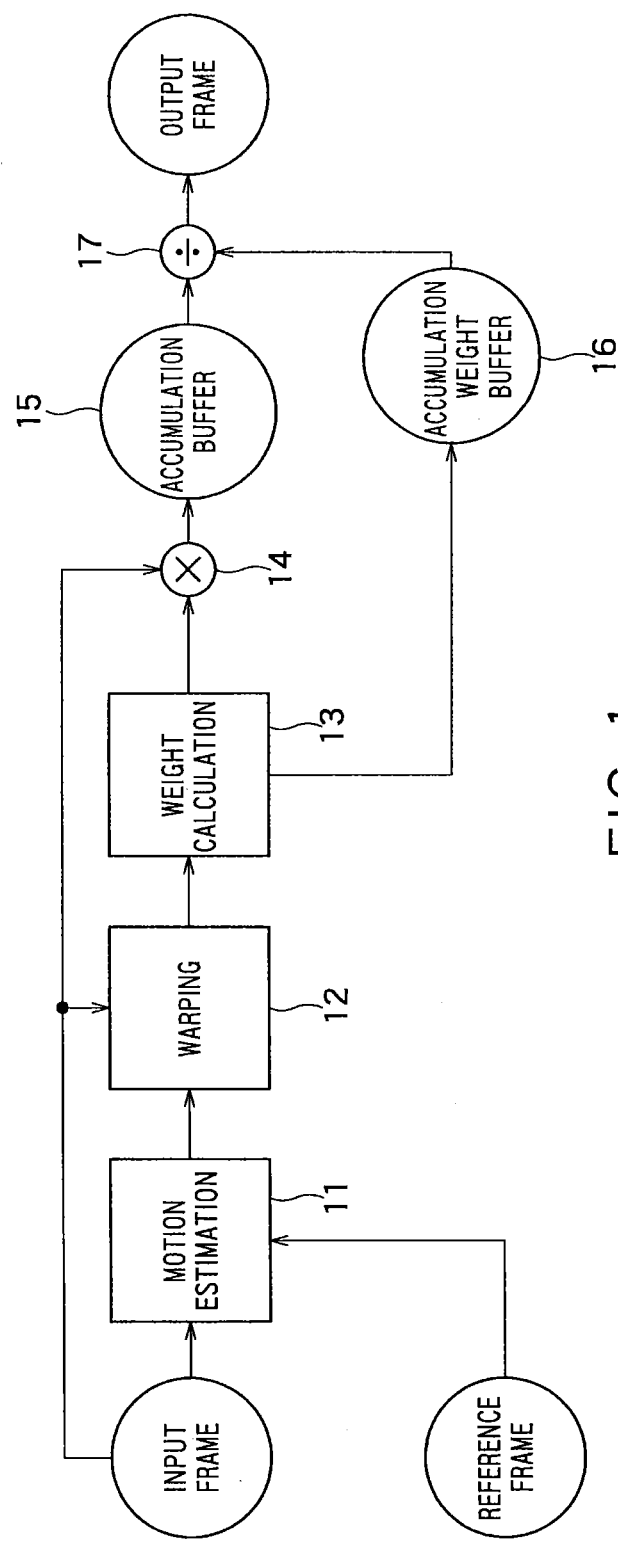
FIG. 1 is a block diagram of an image processing device according to a first embodiment.

FIG. 1 is a block diagram of an image processing device according to a first embodiment.

This image processing device includes a motion estimating unit 11, a warping unit 12, a weight calculator 13, a weighting unit 14, an accumulation buffer 15, an accumulation weight buffer 16 and a weight normalizing unit 17. This device performs processing such as motion estimation, warping, weight calculation and normalization on the basis of one or more input frames and a reference frame, and generates an output frame. Elements 14, 15, 16 and 17 correspond to an image generator to generate an output frame on the basis of the calculation result in the weight calculator 13 and the input frame.

The motion estimating unit 11 calculates motion vectors for pixels of the input frame by estimating motion from the input frame to the reference frame. The motion estimating unit 11 corresponds to an example of a motion vector acquirer to acquire motion vector to a reference frame for pixels of the input frame. As described later, the motion vector acquirer may acquire motion vectors by reading out the motion vector given in advance from a recording medium without performing motion estimation.

The warping unit 12 generates first position information in a frame (first frame) of the same/different resolution as/from the input frame, on the basis of position information on the pixel and the motion vector calculated in the motion estimating unit 11, every pixel of the input frame. For example, the first position information is generated by adding a value multiplying the position information by the resolution ratio between an output frame and the input frame, and a value multiplying the motion vector by the resolution ratio. The warping unit 12 corresponds to a position generator to generate the first position information.

The weight calculator 13 calculates a weight to each pixel in the first frame so as to decrease the weight as the distances from positions indicated by first position information increases. The resolution of the first frame is the same as the resolution of the output frame.

Moreover, the weight calculator 13 calculates the total sum of the weight calculated in the weight calculator 13, for each pixel of the first frame. That is, in a case where there are a plurality of input frames, the total sum of weights with respect to the total input frames is calculated for each pixel of the first frame. The accumulation weight buffer 16 is a buffer to store the total sum of weights for each pixel of the first frame. Here, it is assumed that the accumulation weight buffer 16 holds a frame of the same resolution as the first frame, as an "accumulation weight frame", and holds the total sum of weights in a format in which the total sum of weights is stored in pixels of this accumulation weight frame. The resolution of the accumulation weight frame is the same as the output frame. Here, as described later, in specific examples of the present embodiment, instead of calculating and storing the total sum of weights at one time, by cumulatively adding the weights calculated for each pixel of an input frame to pixels of an accumulation weight frame whenever a pixel of the input frame of the processing target is switched, the total sum of weights is calculated for each pixel of the first frame.

The weighting unit 14 calculates, for each pixel of the first frame, the total sum of weighted pixel values obtained by weighting pixel values of the respective pixels of the input frame by the weights calculated by the weight calculator 13. That is, in a case where a plurality of input frames are present, the total sum of weighted pixel values with respect to the total input frames is calculated for each pixel of the first frame. The accumulation buffer 15 is a buffer to store the total sum of weighted pixel values for each pixel of the first frame. Here, it is assumed that the accumulation buffer 15 holds a frame of the same resolution as the first frame, as an "accumulated frame", and holds the total sum of weighted pixel values in a format in which the total sum of weighted pixel values is stored in this accumulated frame. The resolution of the accumulated frame 15 is the same as the output frame. Here, in the specific examples of the present embodiment described later, instead of calculating and storing the total sum of weighted pixel values at one time, by cumulatively adding the weighted pixel values calculated for each pixel of an input frame to pixels of the accumulated frame 15 whenever a pixel of the input frame of the processing target is switched, the total sum of weighted pixel values is calculated for each pixel of the first frame.

The weight normalizing unit 17 calculates an output pixel value by dividing the total sum of pixel values weighted by the weighting unit 14 by the total sum of weights calculated by the weight calculator 13, for each pixel of the first frame, and generates an output frame in which the output pixel value is set to the pixel of the first frame. To be more specific, the output frame is generated by dividing each pixel value of the accumulated frame in the accumulation buffer 15 by a corresponding pixel value of the accumulation weight frame in the accumulation weight buffer 16.

Here, the resolution of the output frame, that is, the resolutions of the accumulated frame and the accumulation weight frame may be higher or lower than the resolution of the input frame or may be the same as the input frame. In a case where it is higher than the resolution of the input frame, super-resolution in which noise is suppressed becomes possible. In a case where it is equal to or lower than the resolution of the input frame, image generation in which noise is suppressed becomes possible. In the following explanation, unless otherwise noted, a case is assumed where the resolution of the accumulated frame and the accumulation weight frame is higher than the resolution of the input frame.

In the following, each processor is described in detail.

[Motion Estimating Unit 11]

The motion estimating unit 11 reads an input frame and a reference frame from a storage device which stores one or more frames of an input image and the reference frame. By performing motion estimation on the basis of the input frame and the reference frame, a motion vector is acquired for each pixel of the input frame. In a case where a plurality of input frames are used, the next input frame is read out every time processing on one input frame is finished.

Here, each frame of the input image may be a frame of a moving image or may be an individual frame of a plurality of still images. Each frame of the input image may be acquired while a positional gap is temporally caused by some factors such as blurring at the time of imaging, for example. In this case, by operation of the present embodiment, it is possible to acquire a high-resolution output frame in which the positional gap is corrected.

Figure 3:
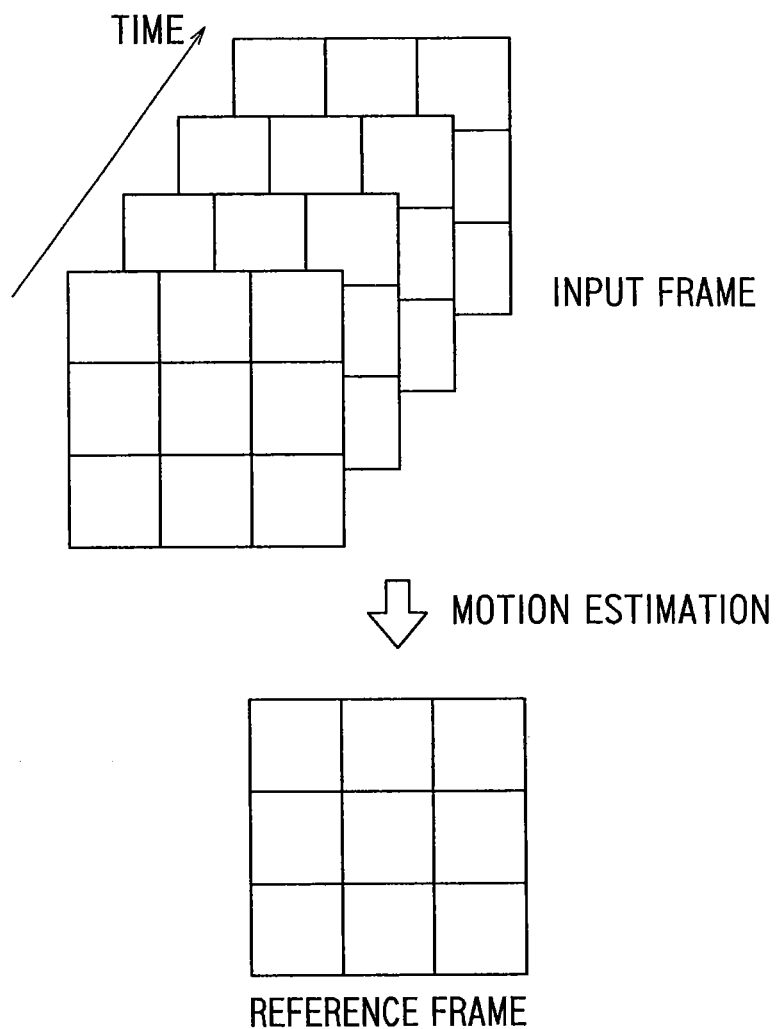
FIG. 3 is a diagram illustrating a state where a motion vector is acquired for each of a plurality of input frames with respect to the same reference frame.

The reference frame may be one frame of the input image or may be a frame of an image that is totally different from the input image. In a case where it is one frame of the input image, the reference frame may be a frame which is temporally before the input frame or may be a frame which is temporally after it. For example, the frame at time "t" may be set as a reference frame and the frames at times "t+1", "t+2" and "t+3", and so on, may be set as input frames. In a case where four or more input frames at regular time intervals are input as illustrated in FIG. 3, motion estimation is performed on the basis of the first input frame at the earliest time and the reference frame, next, motion estimation is performed on the basis of the second input frame and the reference frame, and motion estimation with respect to the same reference frame may be performed in the same way for subsequent frames.

Here, the value of coordinates "(x,y)" of the input frame is defined as "$I_{src}(x,y)$".

The value of the input frame may be a scalar or a vector. For example, there is a luminance value as the scalar, and there are "RGB" and "YUV" in a color image as the vector.

Moreover, the value of coordinates "(x,y)" of the reference frame is defined as "$I_{ref}(x,y)$". In the present embodiment, although the resolutions of the input frame and the reference frame are assumed to be identical, these resolutions may be different. In this case, in motion vector scale conversion described below, scale conversion only has to be performed taking into account the difference between these resolutions.

<Motion Estimation>

As described above, the motion estimating unit 11 acquires a motion vector to a reference frame every pixel of an input frame by performing motion estimation on the basis of the input frame and the reference frame. Various methods can be used for detection of the motion vector. Here, as an example, the one using block matching is described. However, a method of the motion estimation is not limited to this.

The block matching is a method of dividing an input frame into rectangular blocks and searching for a block corresponding to each block from a reference frame. The block size (height and width size) is expressed by "M1" and "M2", and the position of the block is assumed as "i","j". As an error function to find motion, it is possible to use Mean Absolute Difference ("MAD"), and so on. The formula of "MAD" is shown below.

$$MAD$$

$$MAD(i, j, u) = \frac{1}{M_1 M_2} \sum_{0 \le m < M_1, 0 \le n < M_2} |I_{src}(M_1 i + m, M_2 j + n) - I_{ref}(M_1 i + m + u_x, M_2 j + n + u_y)| \quad \text{[Formula 1]}$$

Here, "u=$(u_x, u_y)^T$" is established ("T" shows transposition). "u" indicates a motion vector to be evaluated. Mean square error may be used instead of "MAD".

When a search range is assumed to be a rectangle region from "−W" to "W", a block matching algorithm to find motion vector "u(i,j)" at position "i","j" can be expressed as follows.

block matching algorithm $$u(i, j) = \underset{-W \le u_x \le W, -W \le u_y \le W}{\operatorname{argmin}} MAD(i, j, (u_x, u_y)^T) \quad \text{[Formula 2]}$$

Here, $$\underset{-W \le u_x \le W, -W \le u_y \le W}{\operatorname{argmin}} E$$

means to search for "$u_x$","$u_y$" that minimizes error function "E". Moreover, it is assumed that the motion vector of each pixel in a block is identical with the motion vector of the block. Thus, each motion vector is calculated for all pixels in the input frame.

Moreover, in the motion estimation, matching, in units of pixels (integer position accuracy) may be performed or matching at decimal position accuracy may be performed. For example, it is possible to use an equiangular straight line fitting or the like for the motion estimation at the decimal position accuracy.

Here, although the motion vector is detected in the motion estimating unit 11, a configuration in which the motion vector is given in advance is also possible. For example, a motion vector used for compression in moving image coding like "MPEG2" may be used. Alternatively, it is possible to use a motion vector decoded by a decoder of a compression moving image. That is, the motion vector acquirer according to this embodiment may acquire a motion vector by performing motion estimation from an input frame to a reference frame or may acquire it by reading out the motion vector given in advance from a storage medium.

Moreover, in the motion estimating unit 11, it is possible to find a parametric motion of the full screen by the use of the "Lucas-Kanade" method and find a motion vector therefrom. In the following, motion vector calculation using the "Lucas-Kanade" method is easily described.

The parametric motion expresses motion by parameterized projection. The motion of coordinates "(x,y)" can be expressed as follows by the use of affine transformation, for example.

$$p(x, y)a = \begin{bmatrix} x & y & 1 & 0 & 0 & 0 \\ 0 & 0 & 0 & x & y & 1 \end{bmatrix} \begin{bmatrix} a_0 \\ a_1 \\ a_2 \\ a_3 \\ a_4 \\ a_5 \end{bmatrix}$$

Here, "a=$(a_0, a_1, a_2, a_3, a_4, a_5)^T$" indicates a motion parameter. Conversion (mapping) of coordinate "x" is performed by multiplying "(x y 1 0 0 0)" by vector "a", and conversion of coordinate "y" is performed by multiplying "(0 0 0 x y 1)" by vector "a".

This parameter "a" is estimated from the full screen by the use of the "Lucas-Kanade" method (V. Couture and M. S. Langer, "Can Lucas-Kanade be used to estimate motion parallax in 3D cluttered scenes?", Computer and Robot Vision, p. 63-72, 2007). Here, only one vector "a" is acquired with respect to one input frame.

1. Calculate inclination $$\Delta I_{ref} = \left( \frac{\partial I_{ref}}{\partial x}, \frac{\partial I_{ref}}{\partial y} \right)$$

2. Calculate Hessian matrix $$H = \sum_{x,y} (\nabla I_{ref}(p(x, y)a^{(t-1)})p(x, y))^T (\nabla I_{ref}(p(x, y)a^{(t-1)})p(x, y))$$

3. Calculate $$\Delta a = H^{-1} \sum_{x,y} (\nabla I_{ref}(p(x, y)a^{(t-1)})p(x, y))^T (I_{src}(x, y)I_{ref}(p(x, y)a^{(t-1)}))$$

4. Update $$a^{(t)} = a^{(t-1)} + \Delta a$$

Repeat Steps 2, 3 and 4 until a fixed number. Here, superior "t" indicates the number of repetitions. When parameter "a" is acquired, it is possible to find a motion vector at an arbitrary coordinate position in an input frame by "u(x,y)=p(x,y)a−(x, y)$^T$". "(x,y)" indicates the coordinates of the input frame and "p(x,y)a" indicates coordinates after conversion of the coordinates of the input frame. Therefore, it is possible to find a motion vector by calculating a difference between these.

<Motion Vector Scale Conversion>

To support a case where the resolution (that is, output frame resolution) is different between an input frame and an accumulated frame, the motion estimating unit 11 performs scale conversion of motion vector "u(x,y)" calculated by the resolution of the input frame into the size in the accumulated frame as follows.

$$U(x,y) = \rho u(x,y) \quad \text{[Formula 3]}$$

Here, "U(x,y)" indicates a motion vector subjected to scale conversion, and "u(x,y)" indicates a motion vector before the scale conversion. Moreover, "ρ" indicates a resolution ratio between the input frame and the accumulated frame, that is, the accumulated frame resolution/the input frame resolution. Here, naturally, "ρ" can be an integer or a decimal.

[Warping Unit 12]

Figure 4:
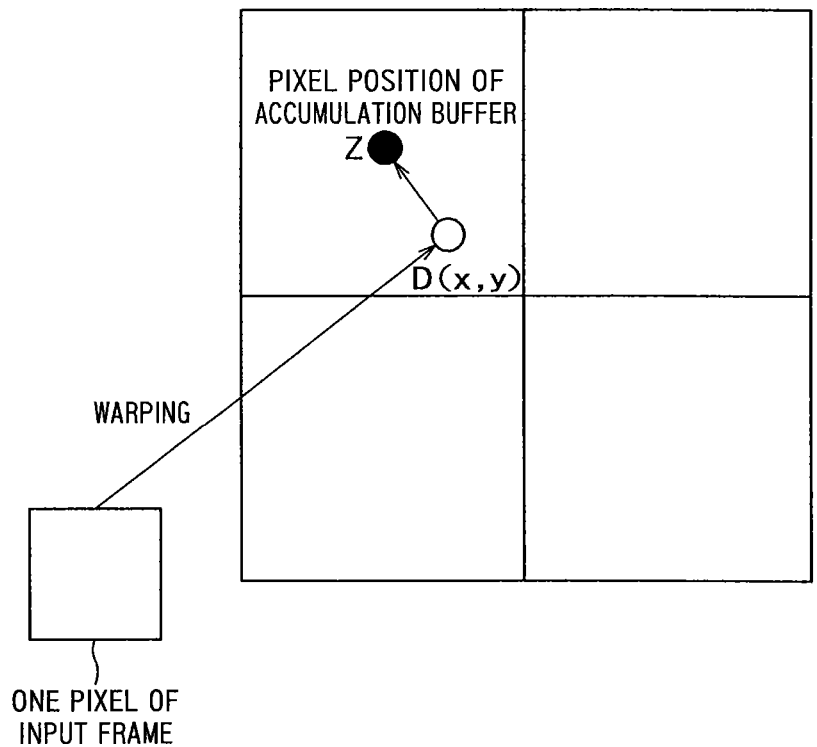
FIG. 4 is a diagram that typically illustrates a state where a position on an accumulated frame corresponding to a pixel of an input frame is found.

The warping unit 12 finds a position on the first frame, that is, a position on an accumulated frame which corresponds to pixel "$I_{src}$(x,y)" of an input frame. When a motion vector "U(x,y)" subjected to scale conversion is used, position (accumulation position coordinates) "D(x,y)" on the accumulated frame corresponding to "$I_{src}$(x,y)" can be expressed as follows. FIG. 4 typically illustrates a state where the position (accumulation position coordinates) on the accumulated frame corresponding to a pixel of the input frame is found.

$$D(x, y) = \rho \begin{bmatrix} x \\ y \end{bmatrix} + U(x, y) \quad \text{[Formula 4]}$$

Here, "ρ" indicates the above-mentioned resolution ratio between the input frame and the accumulated frame, that is, the accumulated frame resolution/the input frame resolution. "ρ" can be an integer or a decimal. The position on the accumulation buffer 15, which is calculated by formula 4, is not limited to integer position coordinates of the accumulation buffer 15 and can be decimal position coordinates (decimal pixel accuracy). In the example illustrated in FIG. 4, position "D(x,y)" on the accumulated frame is decimal position coordinates. Although processing at decimal pixel accuracy is performed in the present embodiment, it is also possible to perform processing at integer pixel accuracy.

Here, in the case of resolution ratio "ρ=1", from formulas 3 and 4, a position that simply adds motion vector "u(x,y)" to position "(x,y)" of the input frame corresponds to the position on the accumulated frame.

[Accumulation Buffer 15]

As described above, the resolution of the accumulated frame held by the accumulation buffer 15 may be higher or lower than the one of the input frame or may be the same as the input frame. For example, by making the resolution of the accumulated frame two times in height and width, three times in height and width and four times in height and width with respect to the input frame and increasing the resolution of the accumulated frame, it is possible to cause a super-resolution effect. The accumulation buffer 15 can be realized by a buffer area managed on an arbitrary storage medium or program.

The coordinates of the accumulated frame are defined as "(X,Y)", and the value of coordinates "(X,Y)" of the accumulated frame is defined as "B(X,Y)". The coordinates of the accumulated frame may be referred to as "accumulation position coordinates".

[Accumulation Weight Buffer 16]

The resolution of an accumulation weight frame held by the accumulation weight buffer 16 is identical with the accumulated frame.

The coordinates of the accumulation weight frame are assumed to be "(X,Y)", and the value of coordinates "(X,Y)" of the accumulation weight frame is defined as "W(X,Y)". Similar to the accumulation buffer 15, the coordinates of the accumulation weight frame may be referred to as "accumulation position coordinate".

[Output Frame]

The resolution of the output frame is the same as the accumulated frame and the accumulation weight frame. The value of coordinates "(X,Y)" of the output frame is defined as "$I_{out}$(X,Y)".

[Weight Calculator 13]

The weight calculator 13 calculates weights for the pixels of the accumulated frame, that have a smaller value as they become farther from the corresponding position in the accumulated frame which is calculated by the warping unit 12, for each pixel of the input frame.

The accumulated frame assumes digital data, and the pixel position is discrete. Here, the input frame and the reference frame, and so on, also assume digital data as well as the accumulated frame. On the other hand, the true position calculated by the warping unit 12, that is, "D(x,y)" found in formula 4 can indicate a decimal position instead of a discrete integer position.

The weight calculator 13 sets weight with respect to a pixel of the pixel position (integer position) of the accumulated frame according to the distance from the true position (position at decimal pixel accuracy) shown by "D(x,y)", and the weighting unit 14 accumulates (adds) a weighted pixel value to each pixel of the accumulated frame. By doing this every pixel of the input frame, a weighted pixel value is cumulatively added to each pixel of the accumulation buffer. In a case where there are a plurality of input frames, cumulative addition for the plurality of input frames is performed. Here, details of the operation of the weighting unit 14 are described later.

Figure 7:
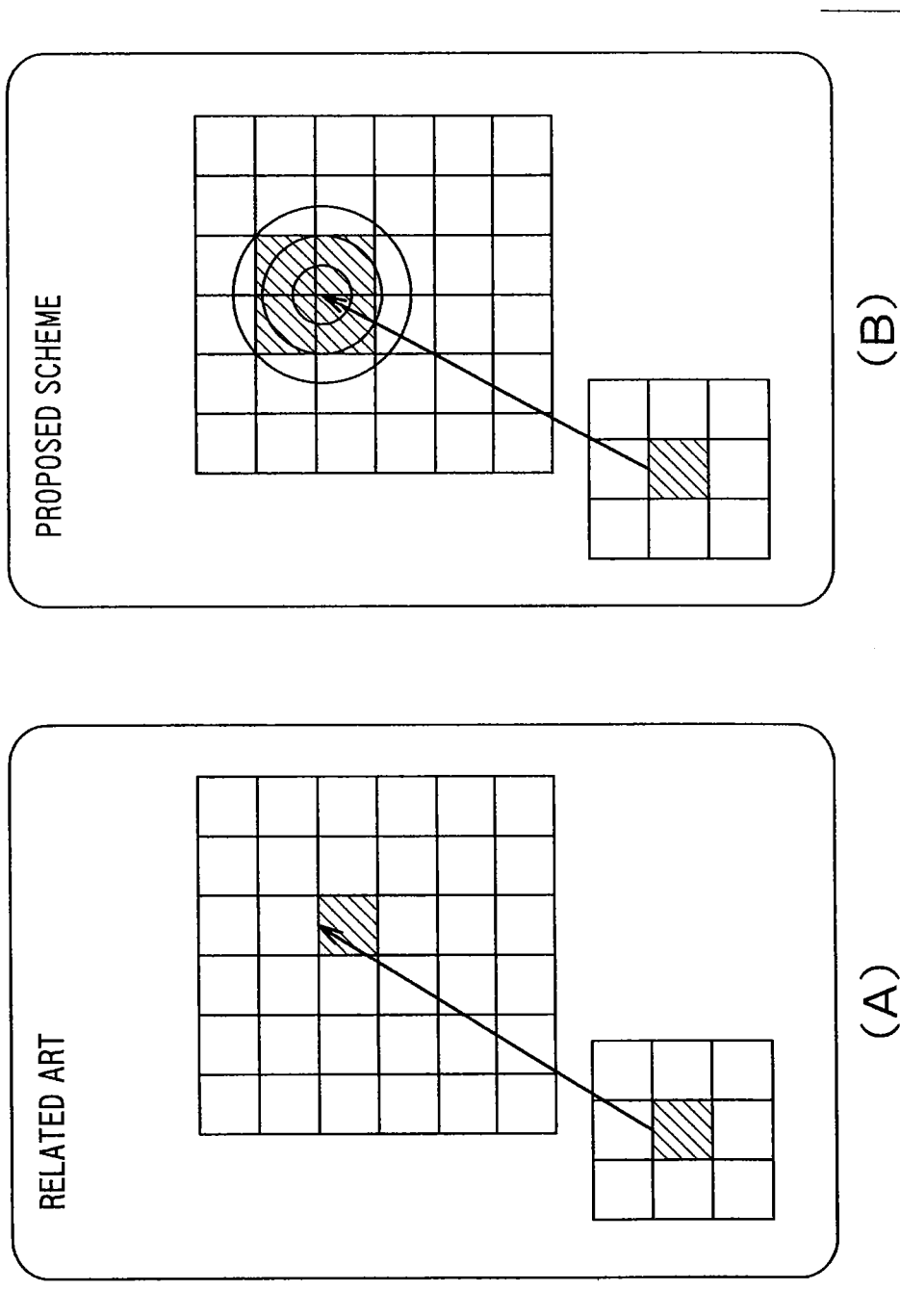
FIG. 7 is a diagram that typically illustrates a state where weight setting is made on peripheral pixels.
Figure 9:
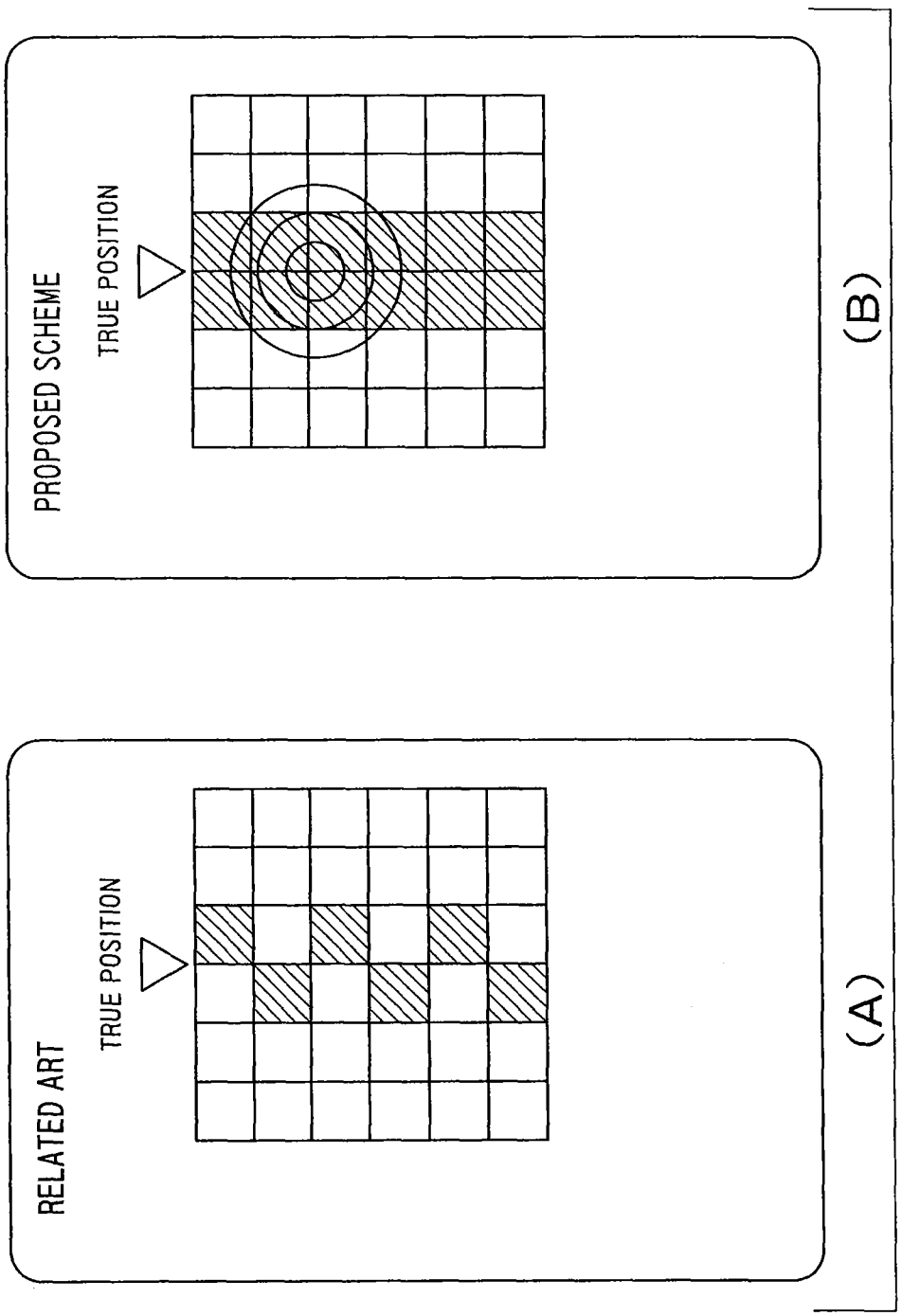
FIG. 9 is a diagram to describe effects of the first embodiment.

In the related art, as illustrated in FIG. 7(A), the coordinates of movement destination (warp destination) accompanying a motion vector are provided at integer pixel accuracy of high resolution, and weighting corresponding to the distance to the movement destination peripheral is not performed, and a large discretization error occurs. Therefore, there is a problem that grid noise as shown in FIG. 9(A) is generated. By contrast with this, according to the present embodiment, as illustrated in FIG. 7(B), since each pixel is weighted according to the distance from the true position of movement destination, expression in the intermediate position between discrete pixel positions in the accumulated frame becomes possible. Therefore, as illustrated in FIG. 9(B), it is possible to suppress the generation of the grid noise.

Although the accumulation position coordinates (true position) are "D(x,y)" as calculated in the warping unit 12, this can be a decimal accuracy position. Therefore, neighborhood discrete coordinates "Z" of accumulation position coordinates "D(x,y)" are calculated as follows. The neighborhood discrete coordinates correspond to the coordinates of the nearest neighbor pixel, that is, the position coordinates of a pixel including accumulation position coordinates "D(x,y)" or the position coordinates of the pixel closest to the accumulation position coordinates "D(x,y)". FIG. 4 typically illustrates a state where neighborhood discrete coordinates "Z" are calculated from accumulation position coordinates "D(x,y)".

$$Z = \begin{bmatrix} X \\ Y \end{bmatrix} = \text{round}(D(x, y)) \quad \text{[Formula 5]}$$

In Formula 5, "round(D(x,y))" means to round off accumulation position coordinates "D(x,y)". "Z=(X,Y)$^T$" shows neighborhood discrete coordinates.

The weight calculator 13 sets weight based on an error (distance) between these neighborhood discrete coordinate "Z=(X,Y)" and accumulation position coordinate "D(x,y)", to a pixel of neighborhood discrete coordinates "Z=(X,Y)". This distance corresponds to the distance between "D(x,y)" and "Z" in FIG. 4. When weight is designed by Gaussian distribution for this distance, weight "w(X,Y)" with respect to neighborhood discrete coordinates "(X,Y)" is calculated as follows.

$$w(X, Y) = \exp\left(-\frac{(Z - D(x, y))^T (Z - D(x, y))}{2\sigma^2}\right) \quad \text{[Formula 6]}$$

Here, "σ" indicates the standard deviation of the Gaussian distribution that shows the attenuation level of the Gaussian distribution. It becomes distribution in which the bottom expands as "σ" becomes large.

Figure 5:
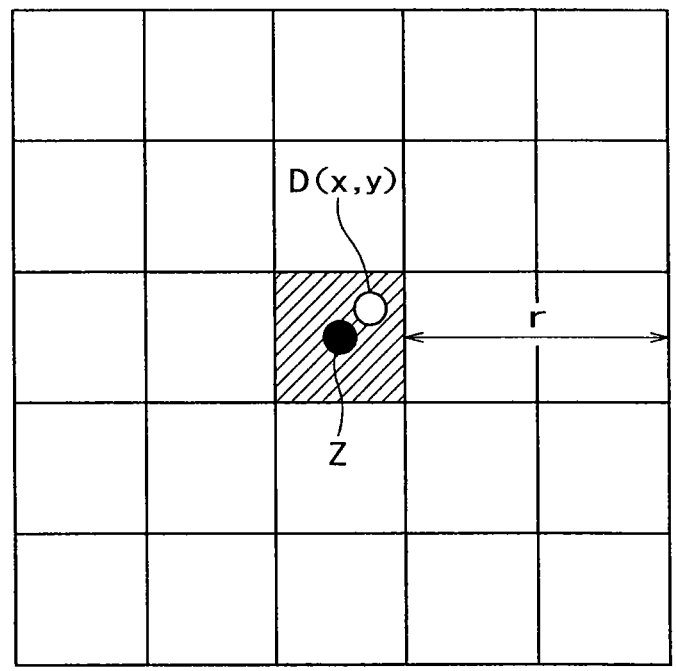
FIG. 5 is a diagram that illustrates an example of a pixel having neighborhood discrete coordinates and peripheral pixels thereof.

However, the weight is not limited to be given to the pixel of the neighborhood discrete coordinates, and weight corresponding to the distance to a peripheral pixel of the neighborhood discrete coordinates is given thereto. As illustrated in FIG. 5, the periphery of neighborhood discrete coordinates "Z" is defined by a range of radius "r" with respect to the pixel of the neighborhood discrete coordinates. However, this definition is one example, and other neighborhood definitions are also possible. The nearest neighbor pixel and the peripheral pixel may be collectively referred to as "accumulation pixel".

Figure 6:
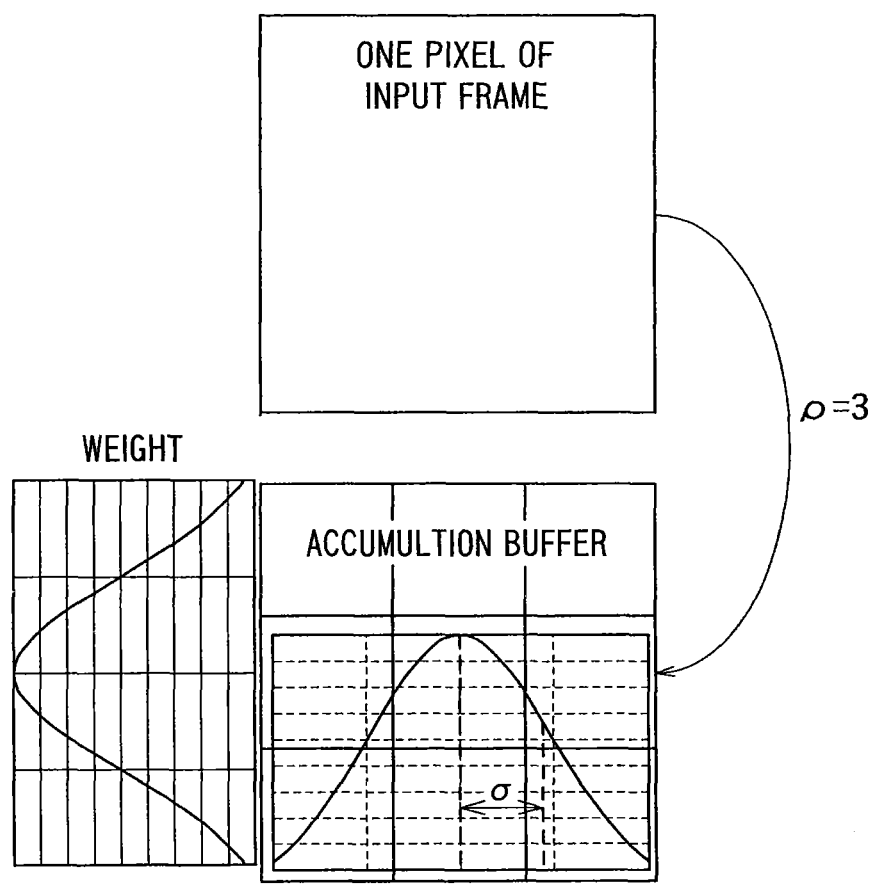
FIG. 6 is a diagram that typically illustrates a relation among a Gaussian distribution, a standard deviation, and a resolution ratio.

When the local coordinates of the periphery with respect to the neighborhood discrete coordinates are assumed to be "$(m,n)^T$", the weight of the peripheral pixel can be defined as follows. Here, it only has to assume weight to be 0 about a pixel positioned outside radius "r". FIG. 6 typically illustrates the relation among a Gaussian distribution, standard deviation "σ" and resolution ratio "ρ". The center of the Gaussian distribution is made to correspond to the neighborhood discrete coordinates. The weight in the center is the largest and the weight becomes smaller as it goes away to the periphery. Although the distribution is shown in only the vertical and horizontal directions for convenience of writing in FIG. 6, actually, distribution in which the bottom expands from the middle of the center pixel to all peripheral directions is also possible.

$$w(X+m, Y+n) = \exp\left(-\frac{\left(Z+\begin{bmatrix}m\\n\end{bmatrix}-D(x,y)\right)^T\left(Z+\begin{bmatrix}m\\n\end{bmatrix}-D(x,y)\right)}{2\sigma^2}\right)$$ [Formula 7]

Here, although the Gaussian distribution is used, the weight of the peripheral pixel may be defined by the use of the reciprocal as follows.

$$w(X, Y) = \frac{1}{1+\|Z-D(x,y)\|}$$ [Formula 8]

"$\|Z-D(x,y)\|$" indicates the distance. Further, as long as it is a function in which the weight becomes smaller as distance "$\|Z-D(x,y)\|$" becomes larger, weight may be set by the function. For example, the aeolotropic Gaussian distribution along the edge direction may be used.

<Variation of Setting Method of "σ">

"σ" in the weight functions of formulas 6 and 7 expresses the expansion of the Gaussian distribution. As the expansion becomes larger, expansion accumulation becomes possible and therefore it is possible to suppress the generation of grid noise. However, when "σ" is too large, it may become a factor to generate a blur. Therefore, "σ" may be set to a moderate value that is not too large and is not too small. In the following, a setting example of "σ" is shown.

As a setting method example, it is possible to use resolution ratio "ρ" between the input frame and the accumulated frame. In the case of "ρ=1", that is, in a case where resolution conversion is not performed, "σ" may be set to a value close to 0. With respect to original one pixel (one pixel of the input frame), ρ pixels are assumed to be included in each direction of the height and the width in the accumulated frame. In the case of "ρ=3", as illustrated in FIG. 6, "3×3" pieces of pixels are assumed to be included in the accumulated frame with respect to original one pixel. Therefore, the Gaussian distribution in which 95% of expansion of original one pixel is acceptable can be calculated as $$\sigma = \frac{1}{2}\frac{\rho}{2}$$

from the characteristics of the Gaussian distribution.

Moreover, "σ" also depends on the accuracy of motion estimation. When the accuracy of motion estimation is high, even if "σ" is a small value, grid noise is not generated.

However, when the motion estimation accuracy is low, if "σ" is not made large, it is not possible to suppress the generation of grid noise.

In the resolution of the input frame, it is assumed that an error of the motion estimation can be estimated as "ε" pixels. In this case, it becomes an error of $$E = \rho\epsilon$$

in the resolution of the accumulated frame.

For example, in a case where weight is given by about a half of this error, "σ" can be designed as follows.

$$\sigma = \frac{1}{2}\rho\varepsilon$$

[Weighting Unit 14]

The weighting unit 14 calculates a weighted pixel value by weighting (multiplying) the weight calculated in the weight calculator 13 by pixel "$I_{src}(x,y)$" of an input frame, and accumulates it in the pixel of an accumulated frame. The accumulation is performed by cumulative accumulation. That is, every time a pixel of the input frame of a processing target is changed, the weighted pixel value is cumulatively added to a pixel of the accumulated frame. When there is a pixel in which the value subjected to final cumulative addition after the end of processing on all pixels of all input frames is zero or equal to or less than a certain value, the value of the pixel may be calculated by interpolation from a peripheral pixel.

In the following, operation performed by the accumulation buffer 15 for the accumulation with respect to a pixel of neighborhood discrete coordinates "$Z=(X,Y)^T$" and a pixel group within a peripheral radius "r" thereof is described. As illustrated in FIG. 5, it is assumed that the pixels within the peripheral radius "r" of neighborhood discrete coordinates "$Z=(X,Y)^T$" are other pixel groups in the range of "r" rightward, leftward, upward, downward of the neighborhood discrete coordinates "$Z=(X,Y)^T$", respectively.

When local coordinates peripheral of neighborhood discrete coordinates "$Z=(X,Y)^T$" are written as "$(m,n)^T$", calculation and cumulative addition of a weighted pixel value are performed as follows. "m,n" indicates an integer that satisfies "$-r\leq m\leq r$" and "$-r\leq n\leq r$". Here, in the case of "m=0" and "n=0", it indicates neighborhood discrete coordinates "$Z=(X,Y)^T$" itself.

$$B(X+m, Y+n) += w(X+m, Y+n)I_{src}(x,y)$$ [Formula 9]

This formula calculates a weighted pixel value by multiplying "w(X+m, Y+n)" and "$I_{src}(x,y)$", and performs cumulative addition by "+=". "s+=a" means to add "a" to "s". Calculation of this formula is performed for all peripheral pixels.

Figure 8:
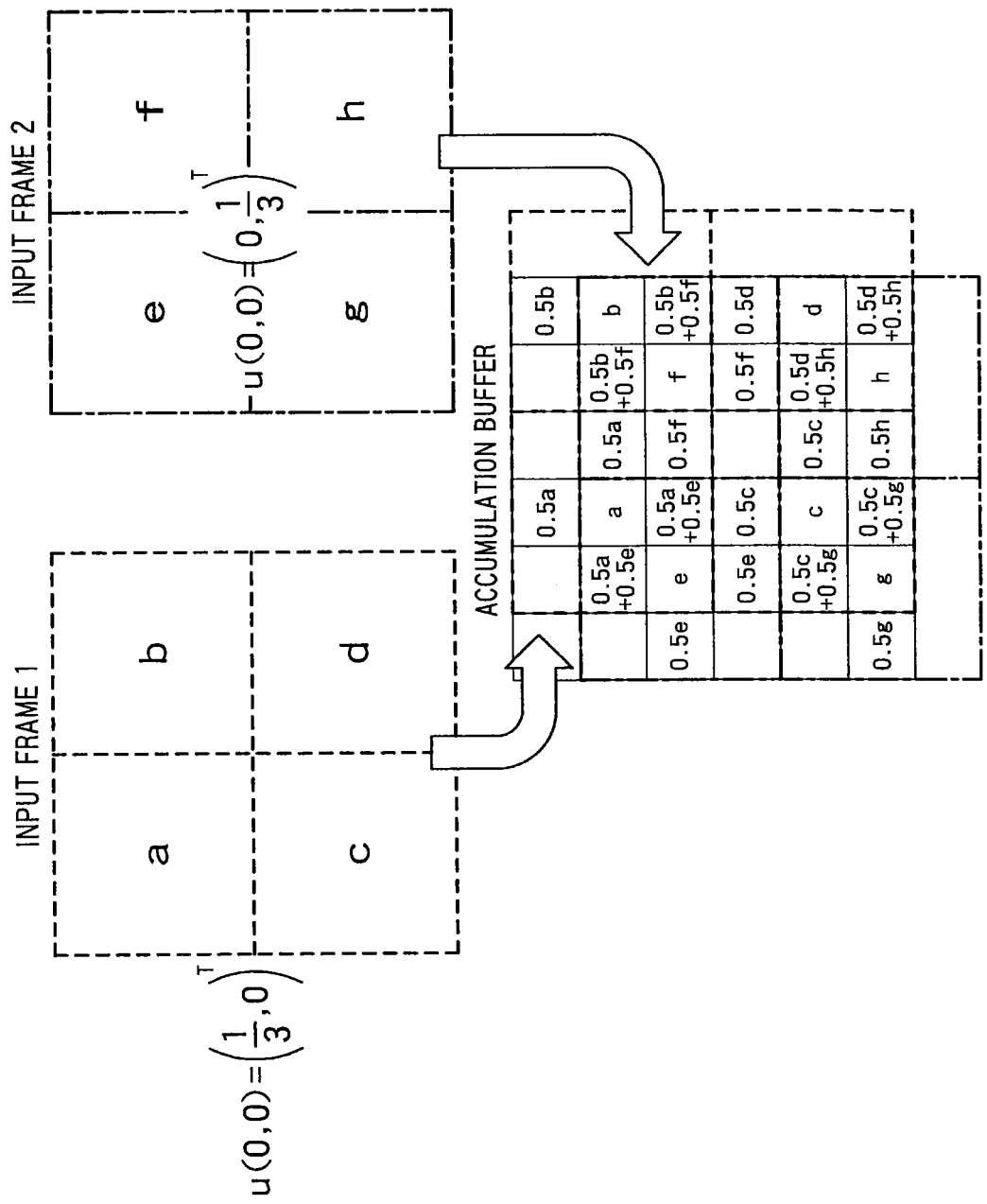
FIG. 8 is a diagram that illustrates an example of cumulative addition to an accumulation buffer.

FIG. 8 illustrates an example of cumulative addition to an accumulated frame.

Cumulative addition is performed for two input frames 1 and 2. The resolutions of the input frames 1 and 2 are "2×2", and the resolution of the accumulated frame is "6×6". Therefore, the resolution ratio between the accumulated frame and the input frame is 3. Motion vector "u(0,0)" of the upper left pixel (pixel with a pixel value of "σ") of the input frame 1 is "$(1/3,0)^T$". It is assumed that the motion vectors of other pixels are "$(1/3,0)^T$" too. Moreover, it is assumed that motion vector "u(0,0)" of the upper left pixel of the input frame 2 is "(0, 1/3)$^T$" and the motion vectors of other pixels are "(0, 1/3)$^T$" too.

Since the resolution ratio is 3, "(1,0)$^T$" multiplying "ρ=3" by the motion vectors on the input frames 1 and 2 becomes motion vector "U(x,y)(=ρu(x,y))" on the accumulated frame. When the coordinates of the upper left pixel (pixel of pixel value "σ") in the input frame 1 are assumed to be "(0.5,0.5)$^T$" that is the center of the pixel, the warp destination by the motion vector is "3*(0.5,0.5)$^T$+(1,0)$^T$=(2.5,1.5)". This corresponds to coordinates of the center of the pixel with pixel value "σ" in the accumulated frame and is identical with neighborhood discrete coordinates by chance. When it is assumed that the weight of this pixel is 1 and weights of left, right, upper, and lower adjacent pixels, as peripheral pixels, are 0.5, a weighted pixel value of the pixel of neighborhood discrete coordinates is "a" and each of the peripheral pixels is "0.5a". Here, for ease of explanation, this example shows a case where weight calculation is not performed for adjacent pixels in the diagonal direction with respect to the pixel of the neighborhood discrete coordinates.

Processing similar to this is performed on other pixels of the input frame 1 and a pixel of the input frame 2. By this means, cumulative addition of weighted pixel values is acquired as illustrated in FIG. 8. For example, in the pixel moved by 2 in the right and bottom directions from the upper left, cumulative addition of the weighted pixel values is "0.5a+0.5e".

<Accumulation of Weight to Accumulation Weight Frame>

The weight calculator 13 accumulates weight calculated for the pixel of the neighborhood discrete coordinates and the peripheral pixels, in a corresponding pixel in the accumulation weight frame according to the following formula. The accumulation is performed by cumulative accumulation. That is, every time a pixel of the input frame of a processing target is changed, weight is cumulatively added to the pixel of the accumulation weight frame. When there is a pixel in which the value subjected to final cumulative addition after the end of processing on all pixels of all input frames is zero or equal to or less than a certain value, the value of the pixel may be calculated by interpolation from a peripheral pixel. An exemplary formula of weight addition (cumulative addition) is shown below.

$$W(X+m, Y+n) += w(X+m, Y+n)$$ [Formula 10]

[Weight Normalizing Unit 17]

The weight normalizing unit. 17 generates an output frame by dividing the value of each pixel of the accumulated frame (cumulative addition of weighted pixel values) by the value of each pixel of the accumulation weight frame (cumulative addition of weight). This is because, since the accumulation number varies depending on each pixel of the accumulated frame, the value of each pixel of the accumulated frame is normalized by division with the accumulation weight frame. A normalization formula is shown below. By dividing value "B(X,Y)" of each pixel of the accumulated frame by value "W(X,Y)" of each pixel of the accumulation weight frame, output frame "$I_{out}$(X,Y)" is generated. Here, in a case where there are a plurality of input frames, the present normalization is performed after completing the cumulative addition of all input frames to the accumulated frame and the accumulation weight frame.

$$I_{out}(X, Y) = \frac{B(X, Y)}{W(X, Y)}$$ [Formula 11]

Figure 2:
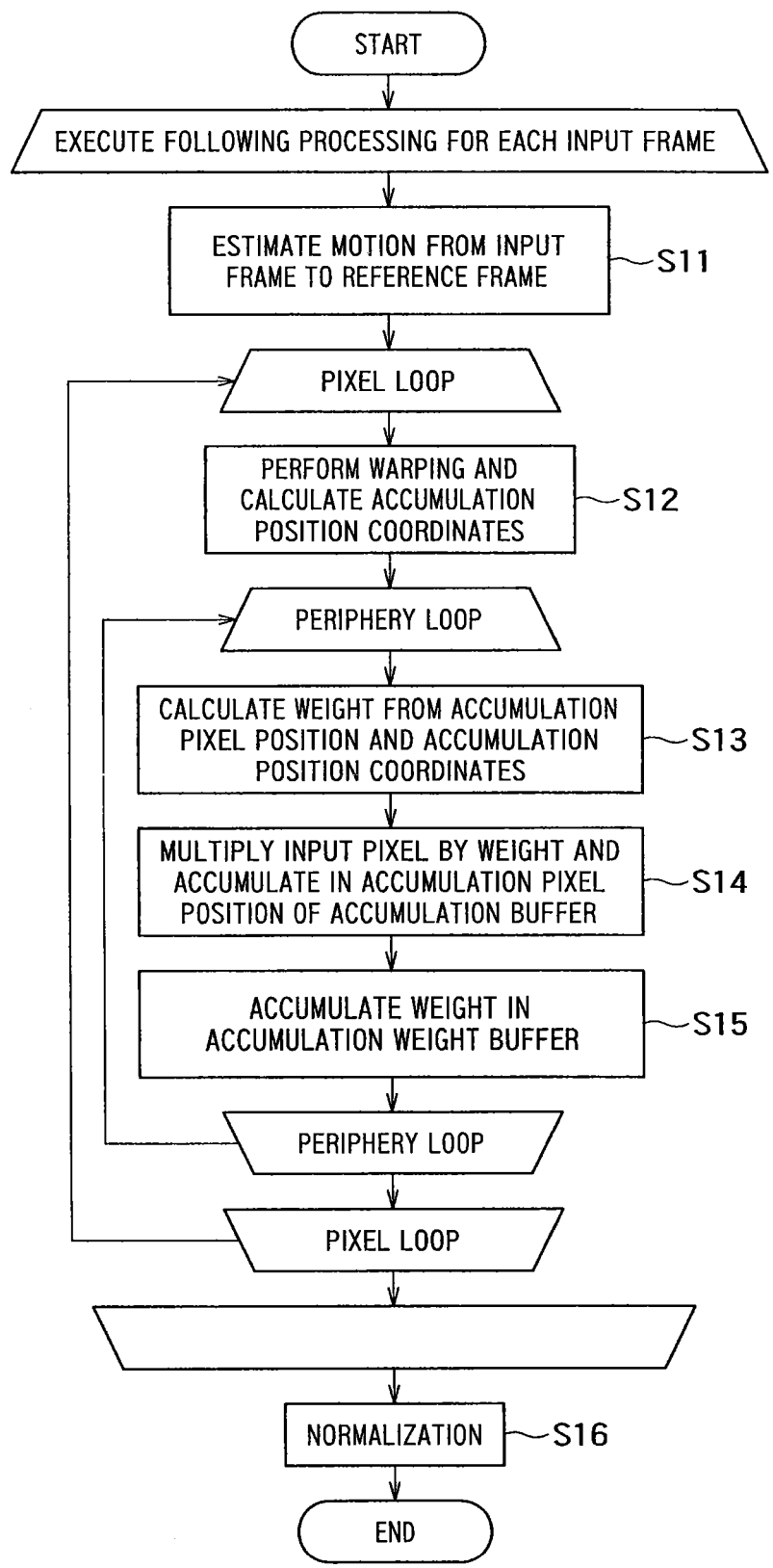
FIG. 2 is a flowchart of operation according to the first embodiment.

FIG. 2 is a flowchart of operation according to the first embodiment.

The motion estimating unit 11 reads an input frame and a reference frame. In a case where there are a plurality of input frames, following steps S11 to S15 are repeated for each of the input frames.

In step S11, by performing motion estimation from the input frame to the reference frame, a motion vector is acquired every pixel of the input frame.

In step S12, one unselected pixel among pixels of the input frame is selected, and accumulation position coordinates (first position information) is calculated according to the position of the selected pixel, the motion vector of the pixel and the resolution ratio between the input frame and the accumulated frame. Specifically, the accumulation position coordinates are found by multiplying the resolution ratio by position information of the selected pixel, multiplying the resolution ratio by the motion vector and adding these multiplication results.

In step S13, the pixel of neighborhood discrete coordinates is found from the accumulation position coordinates, and, moreover, a peripheral pixel is specified. Further, regarding accumulation pixels (the pixel of neighborhood discrete coordinates and the peripheral pixel), weight is calculated based on the distance from the accumulation position coordinates.

In step S14, a weighted pixel value is calculated by multiplying the pixel value of the pixel selected in step S12 by each weight calculated in step S13 and is accumulated in each accumulation pixel (the pixel of the neighborhood discrete coordinates and peripheral pixel) in the accumulated frame.

In step S15, the weight calculated in step S13 is accumulated (added) in each accumulation pixel (the pixel of the neighborhood discrete coordinates and the peripheral pixel) in the accumulation weight frame.

In a case where there is a pixel that is not selected in step S12, steps S12 to S15 are repeatedly performed until all pixels are selected.

It proceeds to step S16 when steps S11 to S15 are completed for all input frames.

In step S16, an output frame is generated by dividing the accumulated frame by the accumulation weight frame.

As described above, according to the first embodiment, the super-resolution with a grid artifact (noise) or the like suppressed can be achieved. Since it is possible to acquire an image in which noise is suppressed even in a case where the number of input frames is one, the present embodiment effectively functions.

(Second Embodiment)

In the first embodiment, in a case where each frame of an input image is acquired while a positional gap is temporally caused by some factors such as blurring at the time of imagining, a frame of a high-resolution image in which the positional gap is corrected is acquired. However, in a case where an input image includes a blur by a lens or degradation such as degradation by image coding, an image of an output frame is an image in which the degradation remains. In the present embodiment, by further removing degradation such as the blur from the image, a high-resolution image in which the degradation is removed or reduced is acquired.

Figure 10:
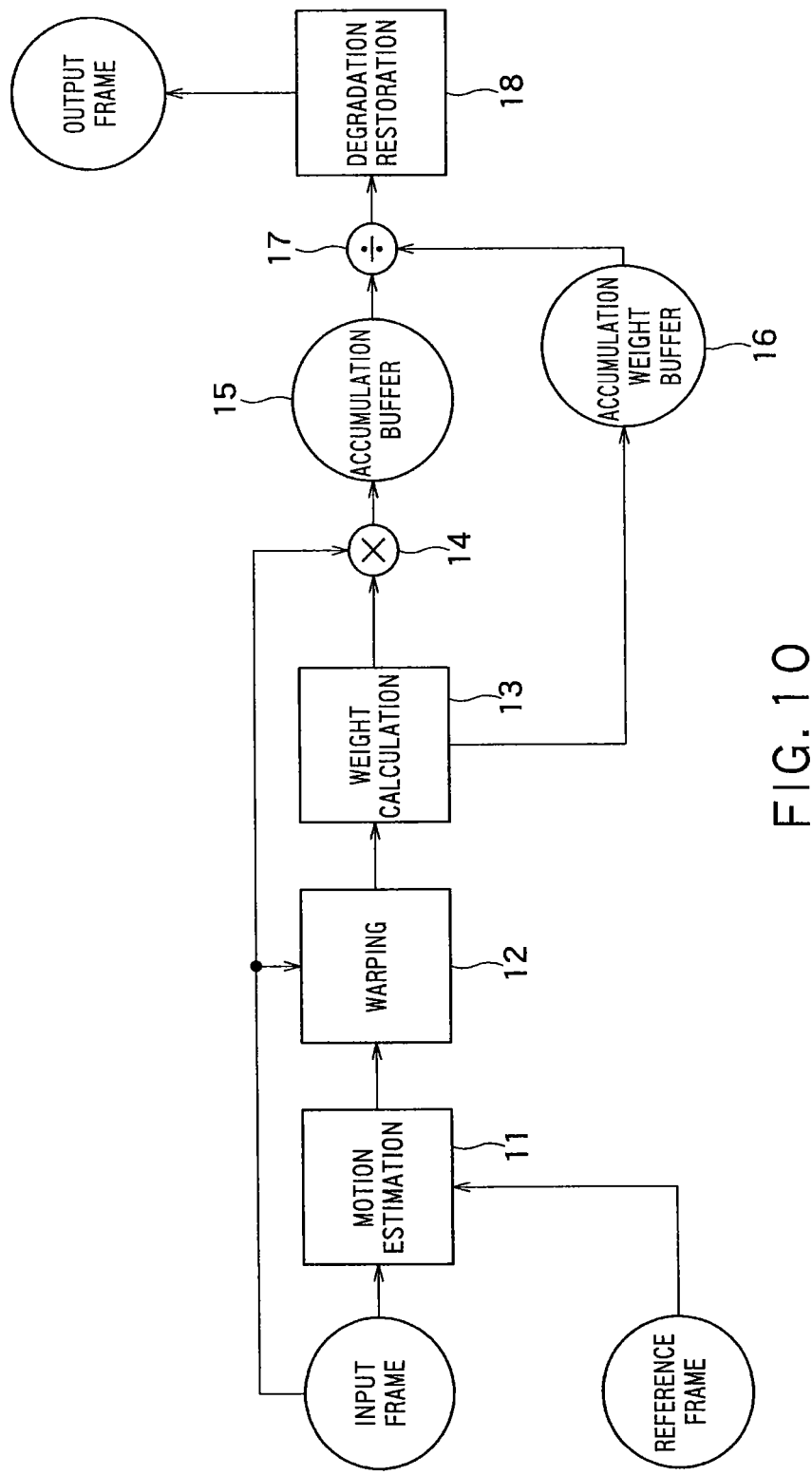
FIG. 10 is a block diagram of an image processing device according to a second embodiment.

FIG. 10 is a block diagram of an image processing device according to a second embodiment. A degradation restoring unit 18 is added on the subsequent stage of the normalizing unit in the device illustrated in FIG. 1. Since the image processing device according to the second embodiment is similar in configuration to the first embodiment except for the degradation restoring unit 18, the same constituent elements are denoted by the same reference numerals and are not repeatedly described herein.

The degradation restoring unit 18 generates an output frame in which degradation such as a blur by a lens is restored, from an image frame acquired by the weight normalizing unit 17. As a technique of restoring image degradation such as the blur by the lens, it is possible to use a general technique or the like.

For example, there is an inverse filter that performs frequency conversion and inverse conversion, a direct regularization method (Wiener filter and Tiknov regularization) and an iterative method (M. R. Banham and A. K. Katsaggelos, "Digital Image Restoration", IEEE Signal Proc. Magazine, 1997), and so on.

As an example, a "Landweber" method that is the simplest iterative method is shown.
Degradation such as a blur is expressed as
"H",
a normalized image is expressed as
"$I_{out}$"
and an image in which the degradation is restored is expressed as
"R"

Here, it is assumed that images (the normalized image and the image in which the degradation is restored) are in a vector form in which they are arranged in the scanning line order. Moreover, it is assumed that degradation "H" is in a vector form.

Here, the restoration problem can be described as follows, as a problem to minimize a difference (error) between a result of degrading the restoration image by "H" and the normalized image. Here, "H" is given in advance.

$$\hat{R} = \underset{R}{\operatorname{argmin}}(I_{out} - HR)^T(I_{out} - HR) \quad \text{[Formula 12]}$$

Here, $$\underset{R}{\operatorname{argmin}} E$$

means to search for "R" that minimizes "ε".

It is a "Landweber" method that solves this minimization problem by a steepest descent method, and it only has to calculate the following formula in a repetitive manner.

$$R^{(t+1)} = R^{(t)} + hH^T(I_{out} - HR^{(t)}) \quad \text{[Formula 13]}$$

Here, superior "t" indicates the number of repetitions. "R" converged by repetition becomes an image in which the degradation is removed from the normalized image.

As described above, according to the second embodiment, by performing a degradation restoration process on a normalized image frame, it is possible to suppress a grid artifact (noise) or the like and suppress degradation such as a blur.

(Third Embodiment)

Figure 11:
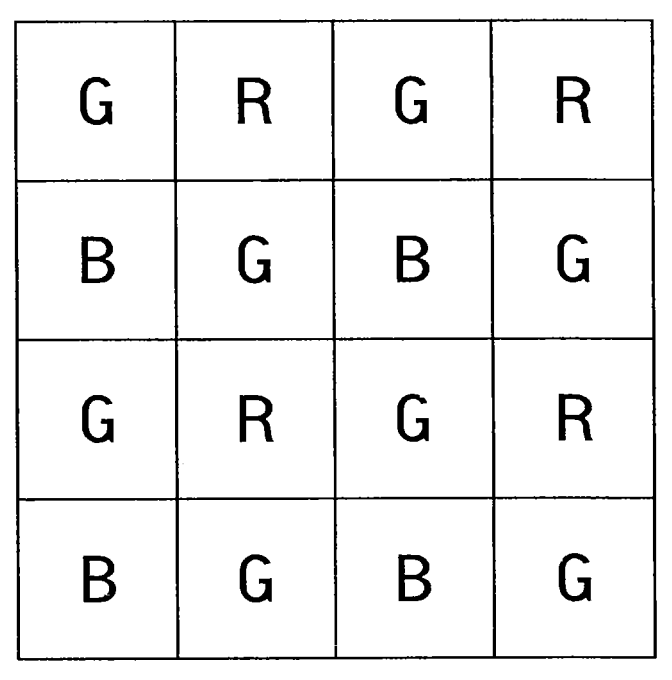

In the present embodiment, a case is shown where an input image has a form called "RAW" data. In an image sensor such as a "CMOS" image sensor, a signal output from an imaging element is digitalized as is and a taken image is acquired as "RAW" data. It is general that the "RAW" data has a Bayer array. FIG. 11 illustrates an example of the Bayer array. Color information on "R", "G" and "B", and so on, is arranged spatially and regularly.

On the "RAW" data, each pixel corresponds to one of "RGB", and all of "RGB" are not provided in one pixel. In the same pixel of an accumulated frame, information on different colors such as "R" and "B" should not be added. Therefore, in the present embodiment, three accumulated frames are prepared for "R", "G" and "B", and three accumulation weight frames are prepared for "R", "G", and "B" too.

Figure 13:
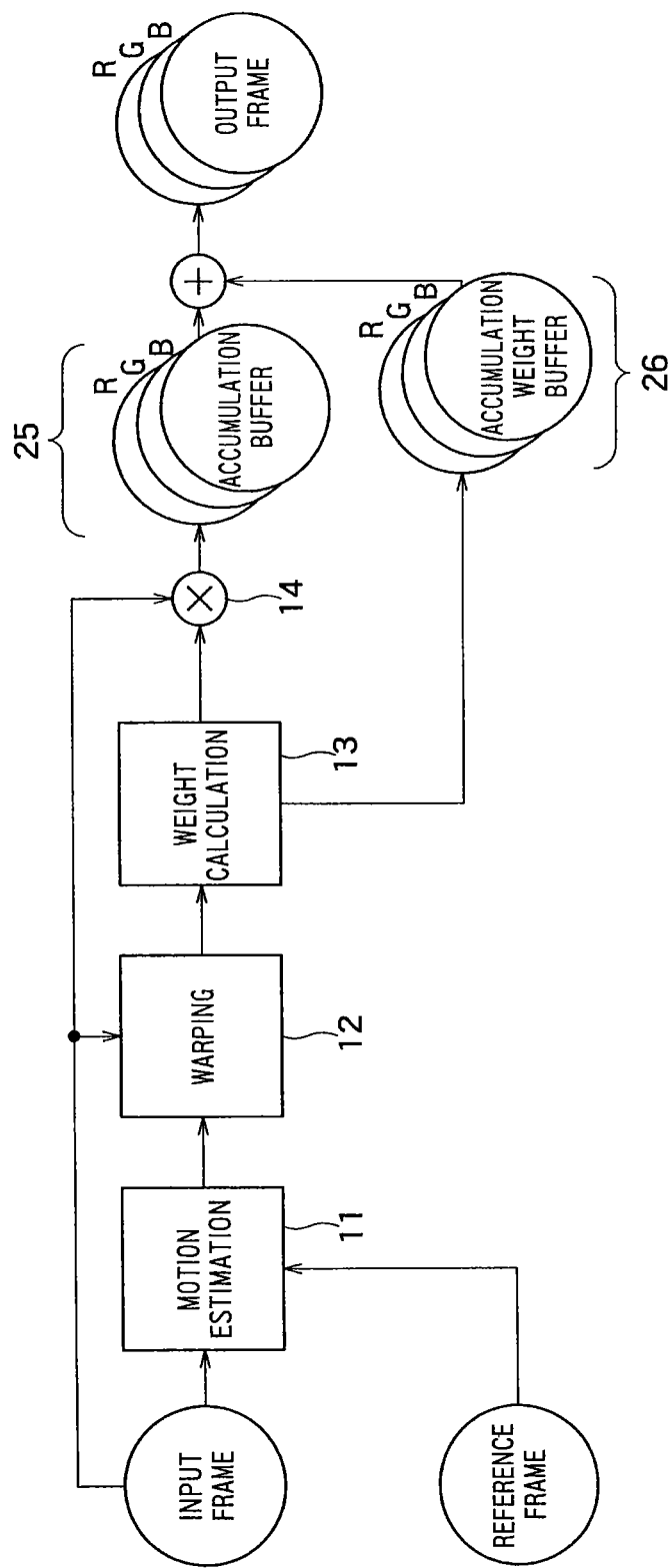
FIG. 13 is a block diagram of an image processing device according to a third embodiment.

FIG. 13 illustrates a block diagram of an image processing device according to a third embodiment. This image processing device includes three accumulation buffers 25 of an accumulation buffer for "R", an accumulation buffer for "G" and an accumulation buffer for "B". Moreover, it includes three accumulation weight buffers of an accumulation weight buffer for "R", an accumulation weight buffer for "G" and an accumulation weight buffer for "B". The accumulation buffers 25 of "R", "G", and "B" hold accumulated frames for "R", "G" and "B" respectively. The accumulation weight buffers 26 of "R", "G" and "B" hold accumulation weight frames for "R", "G" and "B" respectively.

The motion estimating unit 11 performs motion estimation on the basis of an input frame in a "RAW" data form and a reference frame in the "RAW" data form. Since pixels of "RGB" exist in a grid manner in the "RAW" data frame, it is difficult to perform motion estimation in this case. Therefore, for example, only the "R" pixel is sampled from the frame of the "RAW" data to generate an "R" image frame (in the case of the Bayer array in FIG. 11, the resolution becomes ½). Moreover, as for the reference frame, a reference frame of an "R" image is generated in the same way.

The motion estimating unit 11 performs motion estimation by the input frame of the "R" image and the reference frame of the "R" image as well as the first embodiment. In two positions "G" and one position "B" in the same unit region (two "2×2" "G", "R" and "B") of the Bayer array, the same motion vector as the "R" position may be applied or a motion vector of the "G" position or "B" position may be found using linear interpolation. Here, although an example of performing motion estimation on the basis of the "R" image is shown, the motion estimation may be performed on the basis of the "G" image or the "B" image.

It only has to multiply the resolution ratio (here, 2) to turn back the motion vector found in the "R" image to the motion vector in the original "RAW" data. Moreover, in the processing in the warping unit 12, similar to the first embodiment, it only has to multiply the motion vector by the resolution ratio between the "RAW" data and the accumulation buffer.

Figure 12:
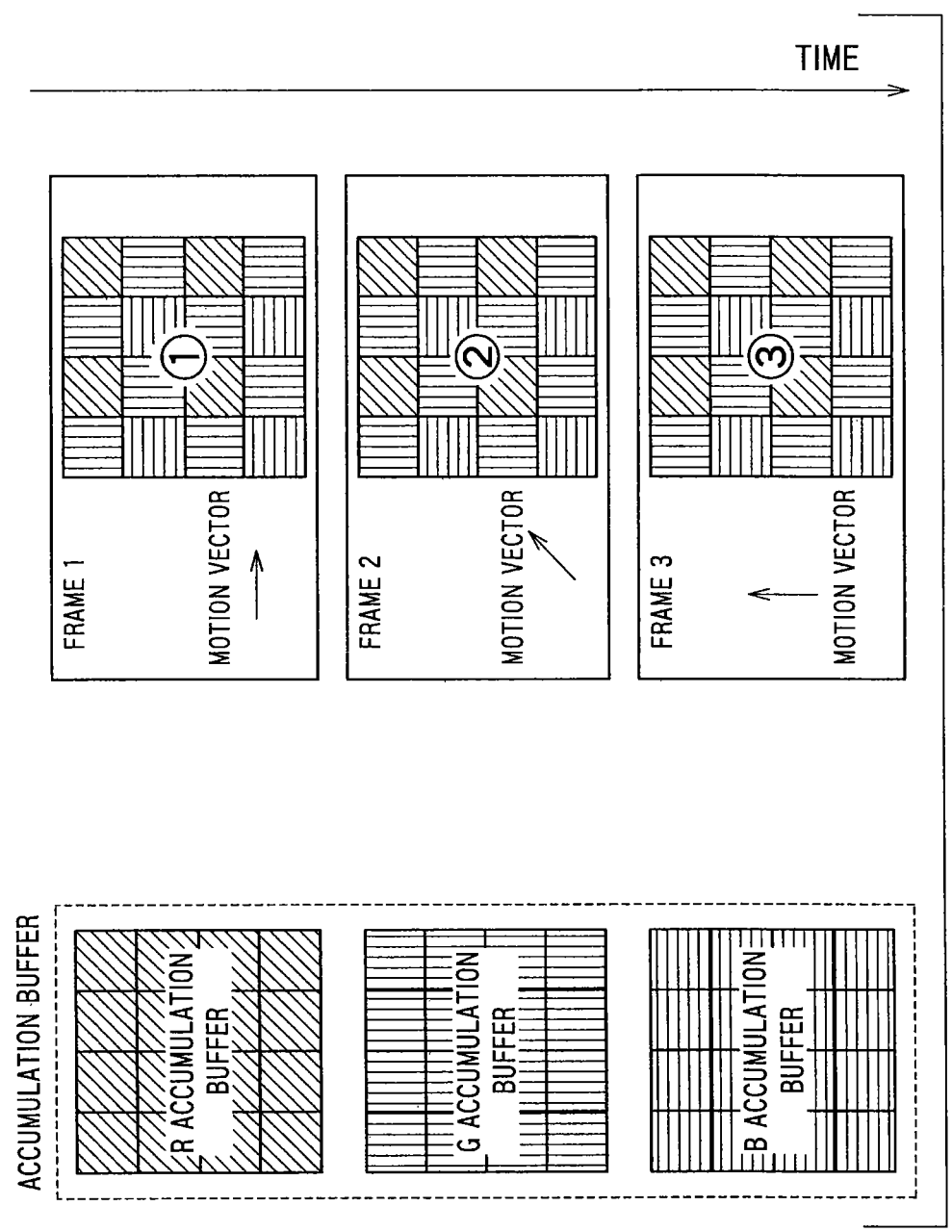
FIG. 12 is a diagram that typically illustrates a state where data of the identical color channel is reflected in the accumulation buffer of each color channel.

Although the weight calculator 13 basically calculates weight as well as the first embodiment, in the present embodiment, the accumulated frame is weighted based on whether a color channel of a pixel of the input frame and a color channel of the accumulated frame are matched. That is, weight of the present embodiment is multiplied in addition to the weight used in the first embodiment. Specifically, if the pixel of the input frame is "R", the weight of the accumulated frame for "R" is assumed to be 1 and the weight of the accumulated frames of other color channels ("G","B") are assumed to be 0. By this means, as illustrated in FIG. 12, since only data of the identical color channel is reflected in each accumulated frame, it is possible to avoid a problem that different colors mix.

The weight normalizing unit 17 performs normalization between the accumulated frame and the accumulation weight frame in the same color channel as well as the first embodiment. By this means, respective output frames of "RGB" are acquired. Afterward, similar to the second embodiment, it is also possible to perform a degradation restoration process on each output frame.

As described above, according to the third embodiment, in the case of an input image of the "RAW" data form, by performing accumulation to an accumulation buffer and an accumulation weight buffer and performing normalization every color channel, it is possible to suppress a grid artifact (noise) or the like even in a case where the input image is "RAW" data.

(Fourth Embodiment)

In the first to third embodiments, a frame output from an image processing device is a frame with temporally the same phase as a reference frame. By contrast with this, in the present embodiment, by performing inverse warping processing on the frame output in the first to third embodiments, a frame matched to the time phase of an input frame is generated. This processing is effective especially in a case where the input image is a moving image.

Figure 14:
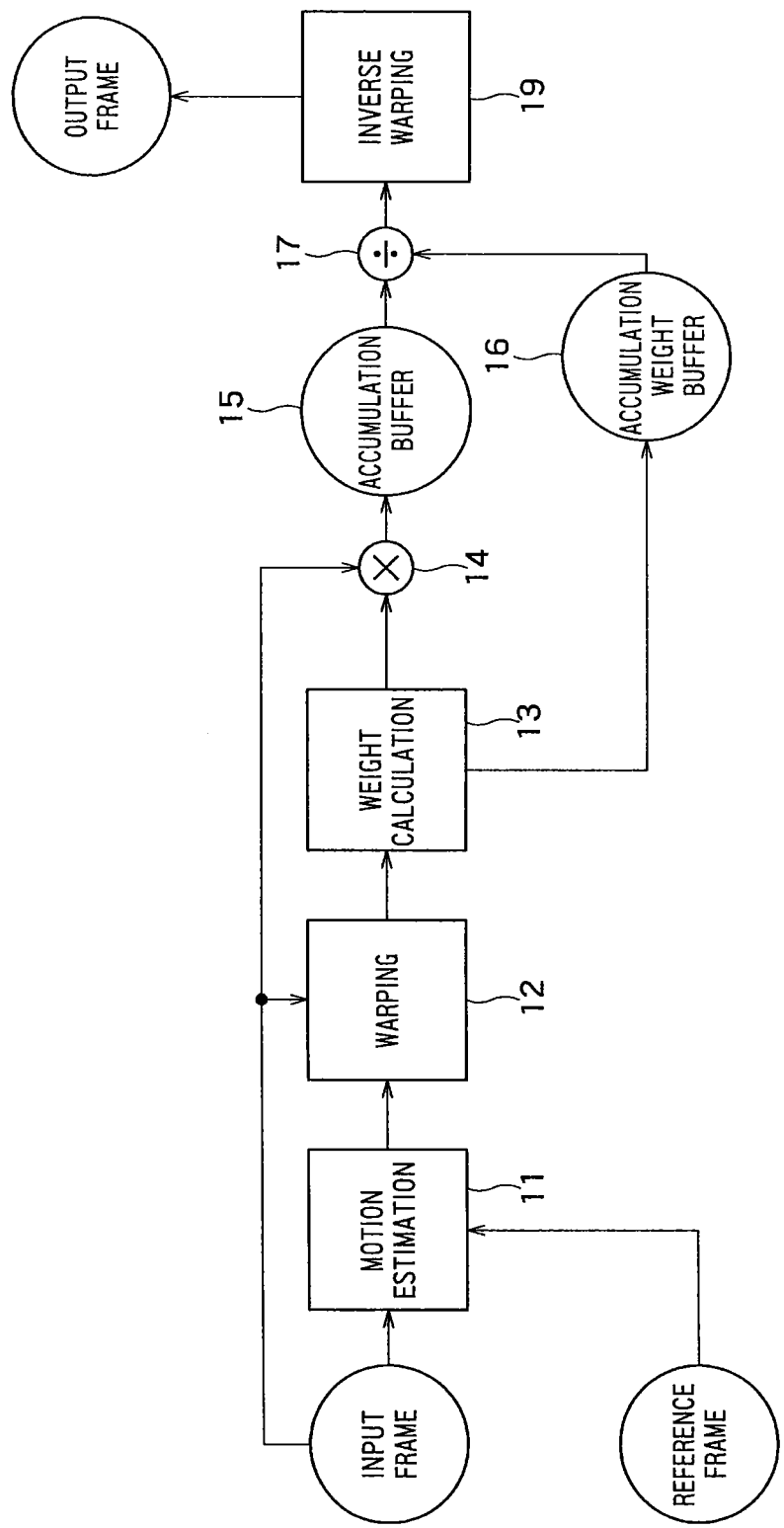
FIG. 14 is a block diagram of an image processing device according to a fourth embodiment.

FIG. 14 illustrates a block diagram of an image processing device according to a fourth embodiment.

Frame "$I_{out}(X,Y)$" normalized in the weight normalizing unit 17 has temporally the same phase as the reference frame and differs from the time phase of the input frame. Then, by temporally restoring (inverse warping) the normalized frame by a motion vector subjected to scale conversion, it is converted into a frame at the same time as the input frame. The converted frame is assumed to be an output of the present device. Since the motion vector found in the motion estimating unit 11 is a motion vector from the input frame to the reference frame, by restoring the normalized frame by the use of the motion vector, it is possible to acquire an output frame matched to the time phase of the input frame.

In the following, inverse warping processing is described in detail.

The relation between coordinates "(x,y)" of the input frame and coordinates "(X,Y)" of the accumulated frame (or normalized frame) is as follows.

$$(x, y)^T = \left(\frac{1}{\rho}X, \frac{1}{\rho}Y\right)^T$$

Therefore, the motion vector of coordinates "(X,Y)" can be expressed as follows.

$$U(x, y) = U\left(\frac{1}{\rho}X, \frac{1}{\rho}Y\right) = \left(U_x\left(\frac{1}{\rho}X, \frac{1}{\rho}Y\right), U_y\left(\frac{1}{\rho}X, \frac{1}{\rho}Y\right)\right)^T$$

Here, "$U_x$" and "$U_y$" are assumed to be the "x" element and the "y" element of the motion vector. However, as described in the first embodiment, since the motion vector is calculated only for a discrete pixel position of the input image, there is a possibility that above-mentioned motion vector $$U\left(\frac{1}{\rho}X', \frac{1}{\rho}Y\right)$$

is not calculated. That is, in a case where "(1/ρ)×X" or "(1/ρ)×Y" shows a decimal position, the above-mentioned motion vector is not calculated. Therefore, in such a case, it only has to find the motion vector by the use of a general interpolation method such as linear interpolation.

In the above, although the motion vector of a pixel position in the accumulated frame is calculated using "U(x,y)", "u(x, y)" may be used. In this case, it only has to find motion vector "u(x,y)" in a position of the input frame corresponding to a pixel position of the accumulated frame and find "U(X/ρ,Y/ρ)" by multiplying this "u(x,y)" by resolution ratio "ρ". At this time, since there is a possibility that "u(x,y)" is not calculated, in this case, it only has to calculate it using a general interpolation method such as linear interpolation.

Restoration by inverse warping only has to be performed as follows.

$$I'_{out}(X, Y) = I_{out}\left(X + U_x\left(\frac{1}{\rho}X, \frac{1}{\rho}Y\right), Y + U_y\left(\frac{1}{\rho}X, \frac{1}{\rho}Y\right)\right) \quad \text{[Formula 14]}$$

Here, frame "$I_{out}$" is a frame output by normalizing unit 17 and "$I_{out}'$" is a frame output by an inverse warping unit 19. The value of frame "$I_{out}$" is found only for a discrete pixel position. Therefore, it only has to calculate the value of the discrete pixel position of frame "$I_{out}$" by using a general interpolation method such as linear interpolation.

The formula for the above-mentioned inverse warp is described in more detail as follows. Motion vector "U(X/ρ, Y/ρ)" and position "(X,Y)" of a pixel of a normalized frame are added, and position "(X+Ux(X/ρ,Y/ρ)","Y+Uy(X/ρ,Y/ρ))" is calculated. In the normalized frame, output pixel value "$I_{out}$(X+Ux(X/ρ,Y/ρ)","Y+Uy(X/ρ,Y/ρ))" corresponding to that position "(X+Ux(X/ρ,Y/ρ)","Y+Uy(X/ρ,Y/ρ))" is found. Further, the output pixel value is set to pixel "(X,Y)" in the same position as position "(X,Y)" of the pixel of the above-mentioned normalized frame. By this means, an output frame restored by inverse warping is generated.

As described above, according to the fourth embodiment, by performing restoration by inverse warping on a normalized frame, it is possible to generate an output frame matched to the time phase of an input frame.

Figure 15:
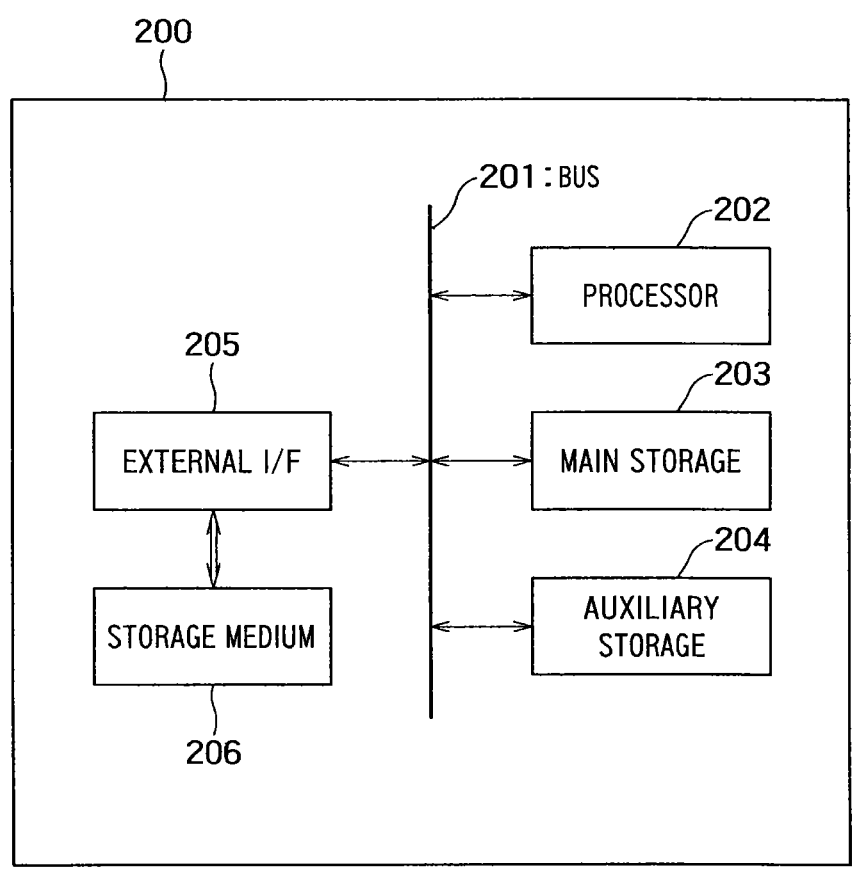
FIG. 15 is a diagram that illustrates a hardware configuration example of an image processing device according to the embodiments of the present invention.

Here, for example, the image processing device of each embodiment can be realized by using a general-purpose computer device as basic hardware as illustrated in, for example, FIG. 15. In this computer device 200, a processor 202 such as a CPU, a memory 203 and an auxiliary storage 204 such as a hard disk are connected with a bus 201, and a storage medium 206 is further connected via an external I/F 205. Each processing block in the image processing device can be realized by making the processor 202 mounted on the above-mentioned computer device execute a program. At this time, the image processing device may be realized by installing the above-mentioned program in the memory 203 or the auxiliary storage 204 of the computer device beforehand, or may be realized by storing it in the storage medium 206 such as a "CD-ROM" or distributing the above-mentioned program through a network and arbitrarily installing this program in the computer device. Moreover, each buffer in the image processing device can be realized by arbitrarily using the memory 203, the hard disk 204 or the storage medium 206 such as a "CD-R", a "CD-RW", a "DVD-RAM" and a "DVD-R", which are incorporated or attached to the above-mentioned computer device. Also, as a hardware other than the general-purpose computer, the image processing device of each embodiment can be realized by a smart-phone or a tablet. Furthermore, the image processing device of each embodiment can be realized by using a processor mounted on a camera or a processor mounted on a wearable device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An image processing device comprising:
a memory configured to store a first frame including pixel values, and accumulated weights corresponding to pixels in the first frame; and
processing circuitry configured to
acquire motion vectors with respect to a reference frame for pixels of an input frame with decimal pixel precision;
assign first position information indicating a pixel position on the first frame on a basis of a position of the pixel in the input frame and the motion vector to each pixel of the input image;
calculate a weight depending on a distance between the position of the first position information and the motion vector, for each pixel of the first frame;
add a weighted value obtained by multiplying the pixel value of the input image by the weight on the pixel value stored in the memory;
add the weight to the accumulated weight stored in the memory; and
generate an output pixel value, for each pixel of the first frame, on a basis of the accumulated weight stored in the memory and the pixel value stored in the memory.

2. The device according to claim 1, wherein:
the processing circuitry performs the acquiring of motion vectors, the assigning of first position information, the calculating of a weight, the adding of a weighted value and the adding of the weight, for each of a plurality of input frames.

3. The device according to claim 2, wherein the processing circuitry divides the pixel value in the memory by the accumulated weight stored in the memory to generate the output pixel value.

4. The device according to claim 1, wherein the processing circuitry assigns the first position information on a basis of a resolution ratio between the first frame and the input frame.

5. The device according to claim 4, wherein the processing circuitry obtains the first position information by adding the position of the pixel in the input frame multiplied by the resolution ratio to the motion vector multiplied by the resolution ratio.

6. The device according to claim 1, wherein a resolution of the first frame is higher than a resolution of the input frame.

7. The device according to claim 6, wherein the processing circuitry calculates the weight on a basis of a Gaussian distribution having a standard deviation, the standard deviation being determined according to a number of pixels indicating an estimated error on the motion vector and a resolution ratio between the first frame and the input frame.

8. The device according to claim 7, wherein the processing circuitry calculates the weight by applying a nearest neighbor pixel, in the first frame, of the pixel position indicated by the first position information for a center of the Gaussian distribution.

9. The device according to claim 1, wherein the processing circuitry calculates the motion vector by performing motion estimation from the input frame to the reference frame.

10. The device according to claim 1, wherein:
the input frame is in a form of RAW data in which a plurality of color elements are regularly arranged in a pixel row; and
the memory is configured to store the first frame and the accumulated weight for each of the color elements, and the processing circuitry calculates the output pixel value for each of the color elements.

11. The device according to claim 1, wherein the processing circuitry performs a degradation restoration process on an output frame including the output pixel values to reduce image degradation contained in the output frame to acquire a first output frame.

12. The device according to claim 11, wherein the processing circuitry calculates a difference between a frame obtained by degrading a target frame by a predetermined degradation method and the output frame and determines the target frame so as to minimize the difference, the target frame determined being the first output frame.

13. The device according to claim 1, wherein, the processing circuitry employs a motion vector of a first position being a position in the input frame corresponding an output pixel to calculate an output pixel value at a second position indicated by the motion vector originating in the position of the output pixel, on a basis of a resolution ratio between the output frame including output pixel values and the input frame, and sets the output pixel value at the second position to a pixel at a same position as the position of the pixel of the output frame to obtain a second output frame having a same resolution as a resolution of the output frame.

14. An image processing method by processing circuitry, comprising:
storing in a memory a first frame including pixel values and accumulated weights corresponding to pixels in the first frame;
acquiring motion vectors with respect to a reference frame for pixels of an input frame with decimal pixel precision;
assigning, by processing circuitry, first position information indicating a pixel position on a first frame on a basis of a position of the pixel in the input frame and the motion vector to each pixel of the input image;
calculating a weight depending on a distance between the position of the first position information and the motion vector, for each pixel of the first frame;
adding a weighted value obtained by multiplying the pixel value of the input image by the weight on the pixel value stored in the memory;
adding the weight to the accumulated weight stored in the memory; and
generating an output pixel value, for each pixel of the first frame, on a basis of the accumulated weight stored in the memory and the pixel value stored in the memory.

15. A non-transitory computer readable medium having instructions stored therein, which causes a processor when executed by the processor, to perform processing of steps comprising:
storing in a memory a first frame including pixel values and accumulated weights corresponding to pixels in the first frame;
acquiring motion vectors with respect to a reference frame for pixels of an input frame with decimal pixel precision;
assigning, by processing circuitry, first position information indicating a pixel position on a first frame on a basis of a position of the pixel in the input frame and the motion vector to each pixel of the input image;
calculating a weight depending on a distance between the position of the first position information and the motion vector, for each pixel of the first frame;
adding a weighted value obtained by multiplying the pixel value of the input image by the weight on the pixel value stored in the memory;
adding the weight to the accumulated weight stored in the memory; and
generating an output pixel value, for each pixel of the first frame, on a basis of the accumulated weight stored in the memory and the pixel value stored in the memory.

* * * * *